United States Patent [19]

Scott

[11] 4,257,290
[45] Mar. 24, 1981

[54] CHUCK FOR MACHINING EQUIPMENT

[76] Inventor: Morris B. Scott, 1621 Woodbourne Ave., Baltimore, Md. 21239

[21] Appl. No.: 948,352

[22] Filed: Oct. 3, 1978

[51] Int. Cl.³ .............................................. B23B 33/00
[52] U.S. Cl. ................................................... 82/40 R
[58] Field of Search ........................ 82/40 R, 8, 1 C; 279/1 A, 1 ME

[56] References Cited

U.S. PATENT DOCUMENTS

| | | | |
|---|---|---|---|
| 891,602 | 6/1908 | DeMarey | 142/53 |
| 1,595,205 | 8/1926 | McClain | 82/40 R |
| 1,801,719 | 4/1931 | Bulifant | 82/40 R |
| 1,885,848 | 11/1932 | March | 82/2 R |
| 2,514,970 | 7/1950 | Prickett | 82/40 R |
| 3,404,763 | 10/1968 | Reed | 82/40 R |

FOREIGN PATENT DOCUMENTS 169973 10/1961 U.S.S.R. .................................. 82/40 R

Primary Examiner—Leonidas Vlachos
Attorney, Agent, or Firm—Walter G. Finch

[57] ABSTRACT

The invention is an improved chuck for machining operations. It consists of a disc-like piece with tooth-like projections around the periphery, and a removable centering piece at the center thereof. The improved chuck is held in an ordinary three-jaw chuck in a lathe when in use. The work piece is centered on the improved chuck on the side with the tooth-like projections and held in place there by the pressure of a rotating bull-nose tailstock. The improved chuck permits machining the outside surface with the single set-up, whereas the prior art requires two set-ups, usually alternately in a three-jaw and a four-jaw chuck with various attendant difficulties.

4 Claims, 3 Drawing Figures

CHUCK FOR MACHINING EQUIPMENT

BACKGROUND AND SUMMARY OF THE INVENTION

The invention relates to machine tools and in particular to lathe tools, specifically it relates to chucks.

A need has existed for an improved chuck for machining work-pieces of disc-like configuration from very thin thicknesses to rather heavy thicknesses. This invention provides such a chuck that can machine pieces essentially from sheet metal type stock to thicknesses up to the limit of the lathe capacity from chuck to the tail stock.

In the prior art thin work pieces, and in some cases thicker work pieces, had to be machined by trepanning. For work-pieces that were thick enough to grasp in a three-jaw chuck and still have room to perform a portion of the machine work, the prior art required two set-ups. First, in a three-jaw to do a portion of the work, then removing the work piece, turning it around and placing it in a four-jaw chuck to finish the machine work.

The above operations are time consuming, require exacting detail set-up, and can be hazardous. The present invention eliminates these problems.

The present invention provides a disc-like chuck with tooth-like projections around the periphery, and a removable centering piece at the center thereof. The improved chuck is held in an ordinary three-jaw chuck in a lathe when in use. The work piece is centered on the improved chuck on the side with the tooth-like projections and then held in place there by the pressure of a rotating bull-nose tailstock. The bull-nose tailstock pressure is applied through a rubber-like disc on the disc-like end of the bull-nose tailstock.

The improved chuck permits machining the outside surface with the single set-up.

The centering piece of the improved chuck assists in centering the work piece when the outside surface is to be machined concentric with a hole at the center of the work piece disc.

It is, therefore, an object of the invention to provide a chuck for machine operations that can hold a disc-like work piece for machine operations on the exterior surface in a single set-up.

It is another object of the invention to provide a chuck for machine operations that can center a disc-like work piece for machining an external surface concentric with a hole at the center of said work piece.

It is still another object of the invention to provide a chuck for machine operations wherein the disc-like work piece is held to the chuck by pressure applied by a rotating bull-nose tailstock.

It is yet another object of the invention to provide a chuck for machine operations that eliminates the hazards of the prior art.

Further objects and advantages of the invention will become more apparent in light of the following description of the preferred embodiment.

DESCRIPTION OF THE PREFERRED EMBODIMENT

Figures 1, 2:
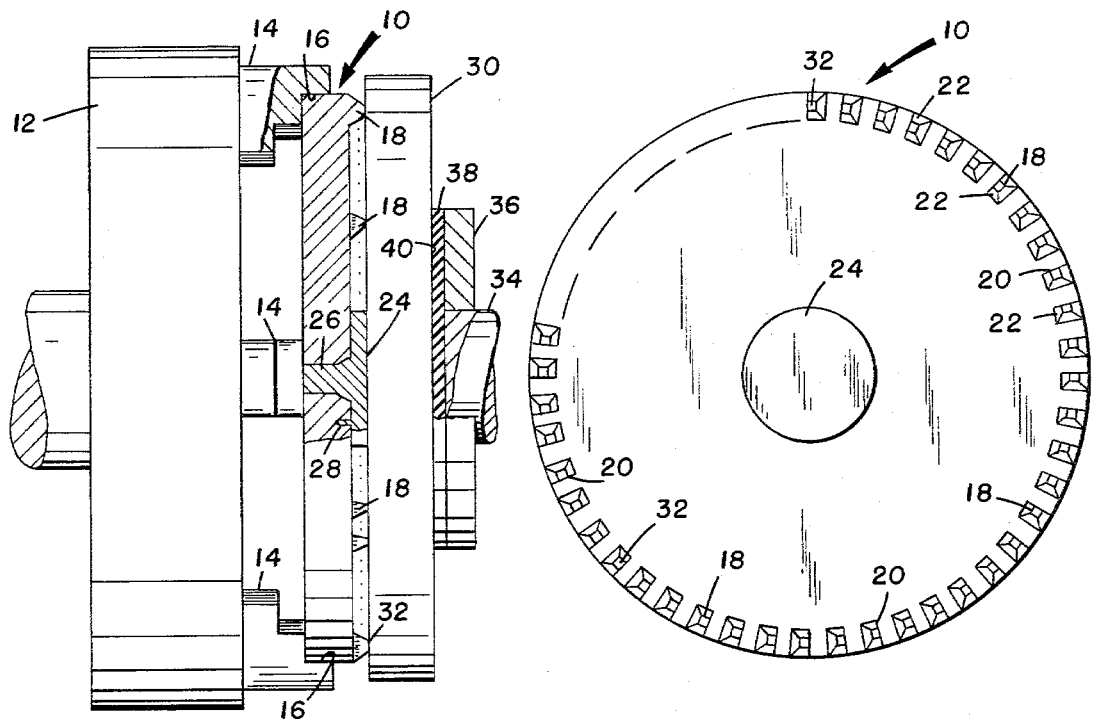
FIG. 1 is a side view of the chuck and the work piece in position between a lathe chuck and a rotating bull-nose tailstock, with part of chuck in section.
FIG. 2 is a front view of the chuck.

Referring to the drawing and particularly to FIGS. 1 and 2, an improved chuck for machining operations is shown at 10.

FIG. 2 is a front view of the chuck 10, and FIG. 1 is a side view of the chuck 10 with the disc-like work piece 30 in position and interfacing with the chuck 10.

The chuck 10 in FIG. 1 is shown held in the three-jaw chuck 12, the three jaws 14 can be seen extending from the body of the three-jaw chuck 12. The gripping surface 16 of the jaws 14 is shown interfacing with exterior edge of the invented chuck 10.

The rotatable bull-nose tailstock 34 with end plate 36 is shown interfacing and pressing against the rubber-like disc 38 that inferfaces with the face 40 of the work piece 30. The rubber like disc 38 may be cemented or otherwise fastened to the end plate 36. The end plate 36 is detachable from the rotatable bull-nose tailstock 34. It is to be noted that the end plate 36 may be varied in size depending on the size of the work piece 30.

The rubber-like disc 38 deforms in accordance with small imperfections or variations in the surface of the face 40 of the work piece 30. Thus, an even pressure is assured as the rotatable bull-nose tailstock 34 with the end plate 36 is moved and pressed against the face 40 of the work piece 30. Once this pressure is applied the work piece 30 cannot escape during the machining operation and the safety of the operation is enhanced. In the prior art the work piece 30 often loosens and breaks loose.

With the surface edge to be machined thus free of any holding encumberances, the entire surface can be machined without a second set-up as in the prior art. This is true regardless of the thickness of the work piece 30, from very thin to the capacity of the machine from the interface points of the improved chuck 10 to the interfacing face of the rubber-like disc 38.

It is to be noted that machining work on the flat faces of the work piece 30 may also be accomplished in the areas outside the periphery of the improved chuck 10 and the rubber-like disc 30 and end plate 36. The maximum diameter of the work piece 30 is only limited by the maximum work diameter of the machine on which the improved chuck 10 is used.

Returning now to the improved chuck 10, the structure consists of the main body of the chuck 10 with a plurality of tooth-like projections 18 around the periphery of one flat surface of the chuck 10, and a removably inserted centering piece 24. The tooth-like projections 18 are integral with the body of the chuck 10, but it is to be understood that the tooth-like projections 18 may be individual separate units fastened to the body of the chuck 18 by suitable means. Such a construction is within the scope and intent of this invention.

The centering piece 24 may be varied in diameter to fit any size hole in the work piece 30, if the work piece 30 has an internal hole through it or a machined depression that may not be a through hole. The centering piece 24 is made of a diameter to fit the hole or machined depression in the work piece. In this manner, the machining of the outside surface of the work piece 30 will be concentric with the hole or machined depression. The centering piece 24 serves as a locator pin. It is also to be understood that the centering piece 24 may also be of other configurations than round to fit other than round holes or depressions in the work piece 30.

The centering piece 24 has a shaft 26 that fits into a center hole in the chuck 10. A locking pin 28 completes the centering piece 24. It is to be noted that the locking pin 28 may be separate pin or an integral part of the centering piece 24.

The tooth-like projections 18 each have a straight side 20, three angled or tapered sides 22, and a flat top surface 32. It is the top surfaces 32 of the plurality of tooth-like projections 18 that interface with the flat surface of the work piece 30 when pressure is applied on the opposite face 40 of the work piece 30 through the rubber-like disc 38 by the end plate 36 and bull-nose tailstock 34.

Figure 3:
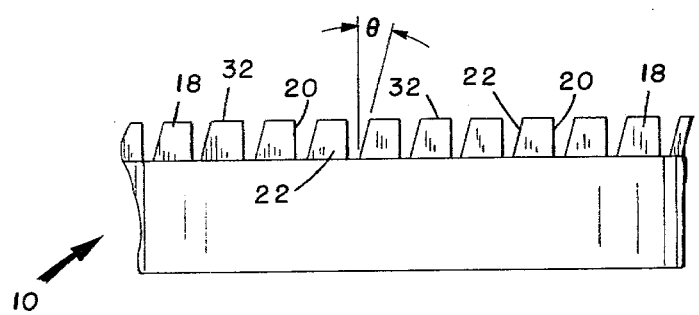
FIG. 3 is an enlarged side view of a portion of the chuck.

The angled sides 22 may be sloped at an angle of 8° with a line perpendicular to the flat surface of the chuck 10, as shown in FIG. 3. However, it is to be understood that variation of this angle or even the omission of the angling is within the scope and intent of this invention. It is also to be understood that bringing the tooth-like projections 18 to a more or less point instead of a top surface 32 is within the scope and intent of this invention.

One advantage of the angling of the angled sides 22 is that it provides small contact surfaces 32 for improved gripping of the work piece 30, while at the same time it provides a wide base for strength where the toot-like projections 18 are integral with the main body of the chuck 10.

Accordingly, modifications and variations to which the invention is susceptible may be practiced without departing from the scope and intent of the appended claims.

What is claimed is:

1. A chuck for machining disc-like work pieces in a single set-up comprising:

a body member, said body member being flat and disc-like, said body member having a first face and a second face, said body member having a centrally located cylindrical aperture therethrough;

a plurality of tooth-like projections, said tooth-like projections being affixed to said first face of said body member, each said tooth-like projection having at least one tapered side to provide a small flat top-side surface that interfaces with said work pieces, said tooth-like projections being spaced around the periphery of said body member;

a work piece centering member, said work piece centering member being flat and disc-like and having a first face and a second face, said work piece centering member having a cylindrical projection centrally located on said second face thereof, said work piece centering member being slidably and removably affixed to said body member by slidably and removably inserting said cylindrical projection into said cylindrical aperture in said body member, thereby said work piece centering member being centrally located on said first face of said body member, said flat and disc-like portion of said work piece centering member extending beyond said first face of said body member to slidably and removably centrally engage a work piece without attachment thereto; and a locking pin, said locking pin being affixed to said second face of said work piece centering member and being slidably and removably inserted into a mating hole in said body member, thereby securing said work piece centering member to said body member in position.

2. The chuck as recited in claim 1, wherein said plurality of tooth-like projections are integral and monolithic with said body member.

3. The chuck as recited in claim 1, wherein said plurality of tooth-like projections are separate individual structures suitably affixed to said body member.

4. The chuck as recited in claim 1, and additionally, a flat rubber-like disc means and an disc-like end plate means, said rubber-like disc means and said disc-like end plate means affixed to a rotating bull nose tailstock to apply pressure to said disc-like work pieces when centered on said chuck for machining disc-like work pieces when mounted in a lathe chuck.

* * * * *